TAPE DRIVE MECHANISM

Filed June 26, 1961

INVENTOR.
MARTIN L. LEVENE
BY Morris A. Rabkin
ATTORNEY 3,111,252
Patented Nov. 19, 1963

3,111,252
TAPE DRIVE MECHANISM

Martin L. Levene, Elkins Park, Pa., assignor to Radio Corporation of America, a corporation of Delaware Filed June 26, 1961, Ser. No. 119,380
9 Claims. (Cl. 226—187)

The present invention relates to an improved tape drive mechanism of the type including a capstan and a pressure roller.

The invention is especially suitable for use in a magnetic tape transport for driving a magnetic record tape. The term "tape," as used herein, is intended to designate any web member, strip, film, or portion thereof, or the like, which is adapted to be driven or controlled in its movement in accordance with the features of this invention.

Known tape drive mechanisms usually include a capstan which is coupled to a relatively constant speed motor through a speed reduction unit. Pucks (rollers), belts or gears are often used in the speed reduction unit. Some disadvantages of speed reduction units are that they consume available space in, and add weight to, the tape transport mechanism. These disadvantages make it difficult to use tape recording and reproducing devices for mobile and airborne applications. Another disadvantage of a speed reduction unit is that it introduces variations in capstan speed and, accordingly, in the speed of the tape. A further disadvantage of a speed reduction unit, especially those including gear trains having anti-backlash devices, is that the drive direction cannot usually be reversed.

It is an object of the present invention to provide an improved tape drive mechanism wherein speed reduction units are eliminated, thereby obviating or reducing the foregoing disadvantages.

It is a further object of the present invention to provide a tape drive mechanism which is lower in cost than many known tape drive mechanisms and yet is capable of driving a tape with an efficiency, reliability, and accuracy comparable to, or better than, such known tape drive mechanisms.

Briefly described, a tape drive mechanism in accordance with an exemplary form of the invention includes a needle-like capstan which is so thin as to be subject to bending or deflecting when a force is applied to it in a direction substantially normal to its axis, and a pair of pressure rollers which together selectively engage the capstan on diametrically opposite sides thereof to prevent its deflection. At least one of the pressure rollers is adapted to pinch the tape against the capstan into driving relationship therewith. The capstan may be directly coupled to the shaft of a drive motor and may be an extension of the drive motor shaft which is machined to the appropriate, reduced diameter. The diameter of the needle-like capstan depends upon the desired tape speed and the nominal speed of the motor. The needle-like capstan is many times smaller than the conventional capstan so that its peripheral speed can be made equal to the desired speed of the tape.

The invention itself, both as to its organization and method of operation, as well as additional objects and advantages thereof, will become more readily apparent from a reading of the following description in connection with the accompanying drawings in which.

Figure 1:
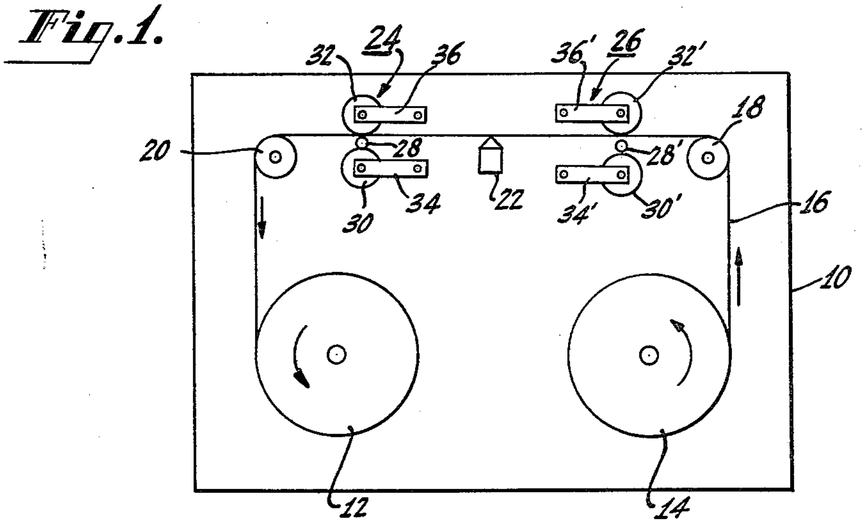
FIGURE 1 is a diagrammatic, plan view of a tape transport incorporating a pair of tape drive mechanisms in accordance with the invention.

Referring more particularly to FIG. 1, there is shown a deck plate 10 on which the elements of the tape transport are mounted. These elements include a pair of tape reels 12 and 14. The reel 14 is shown operating as a supply reel and the reel 12 is shown operating as a take-up reel. The tape transport shown in FIG. 1 is capable of bi-directional operation; that is a tape 16 may be driven from right to left (as viewed in FIG. 1), or in the opposite direction, from left to right.

The tape is driven along the path defined by a pair of guide rollers 18 and 20. A magnetic head 22 is also disposed along the tape path. This magnetic head is adapted to be connected to electronic apparatus for reading signals from and writing signals on the tape 16. A pair of tape drive mechanisms 24 and 26 are disposed, respectively, on opposite sides of the head 22. Each mechanism includes a capstan 28 which is so thin as to be relatively easily subject to some bending or deflection, and a pair of pressure rollers 30 and 32 which cooperate with the capstan to prevent deflection thereof as hereinafter more particularly pointed out. The pressure rollers are pivotally mounted on arms 34 and 36. The parts of the other tape drive mechanism 26 are identified with the same reference numerals as those identifying the parts of the tape drive mechanism 24 but with primes appended.

Each of the capstans 28 and 28' is of needle-like form in that it is slender, and has a diameter many times smaller than the diameter of the pressure rollers 30, 30' and 32, 32'. The diameter of the capstans 28 and 28' in FIG. 1 has been exaggerated to clarify the drawing.

In the mode of tape transport operation shown in FIG. 1, where the tape is driven from right to left, the drive mechanism 24 is operated. The pressure rollers 30 and 32 simultaneously engage the capstan on diametrically opposite sides thereof. The pressure roller 32 presses the tape 16 against the capstan 28 into driving relationship therewith. The pressure rollers prevent the capstan from deflecting despite its needle-like form. The capstan 28 is directly driven by an electric motor and without the interposition of a speed reduction unit. Since the capstan is of very small diameter, it may be driven so that its periphery rotates at a speed equal to the desired speed of the tape by the use of known types of electric motors. For example, a motor which rotates at six thousand r.p.m. directly coupled to the capstan will produce a peripheral capstan speed of 24 (twenty-four) inches per second when the diameter of the capstan is 0.076 inch. Since the speed of the motor can be readily maintained constant, the capstan rotates at such constant speed and drives the tape with minimum or negligible speed variation. Acordingly, flutter and other speed variation defects are minimized or reduced.

The speed of the tape may also be conveniently controlled. For example, a servo system may be used to respond to an error signal (for example, derived in the usual manner from a timing track recorded on the tape and a frequency reference source). The output of the servo system may be used in any known manner to control speed of the motor. Since the capstan is directly coupled to the motor, the speed of the capstan can be corrected or changed rapidly. The cost of a tape driving mechanism such as illustrated, is also much lower than a tape drive mechanism including a speed reduction unit. This is particularly the case because speed reduction units may be high in cost when they are made to high tolerances in order to achieve accurate control of the speed of the tape.

When it is desired to drive the tape from left to right, the pressure rollers 30 and 32 of the tape drive mechanism 24 are disengaged from the tape and the pressure rollers 30' and 32' of the other drive mechanism 26 are engaged with the capstan 28' and the tape. It is also possible to drive the tape from left to right, merely by reversing the direction of rotation of the capstan 28 in the operating drive mechanism 24. However, the use of two drive mechanisms separately for each drive direction provides faster reversal.

Suitable drive mechanisms are provided for the reels 12 and 14. These may be separate reel motors or clutch drives. In either case, the reel drive mechanisms may be of known design. When the tape is driven from left to right, the reel 14 is rotated in a clockwise sense to take up the tape. The other reel 12 may be driven in a clockwise sense to supply the tape. Alternatively, the reel 12 may be allowed to free wheel. Enough drag will be present in the reel drive mechanism to provide sufficient back tension on the tape in accordance with known reel drive design techniques.

Figures 2, 3, 4:
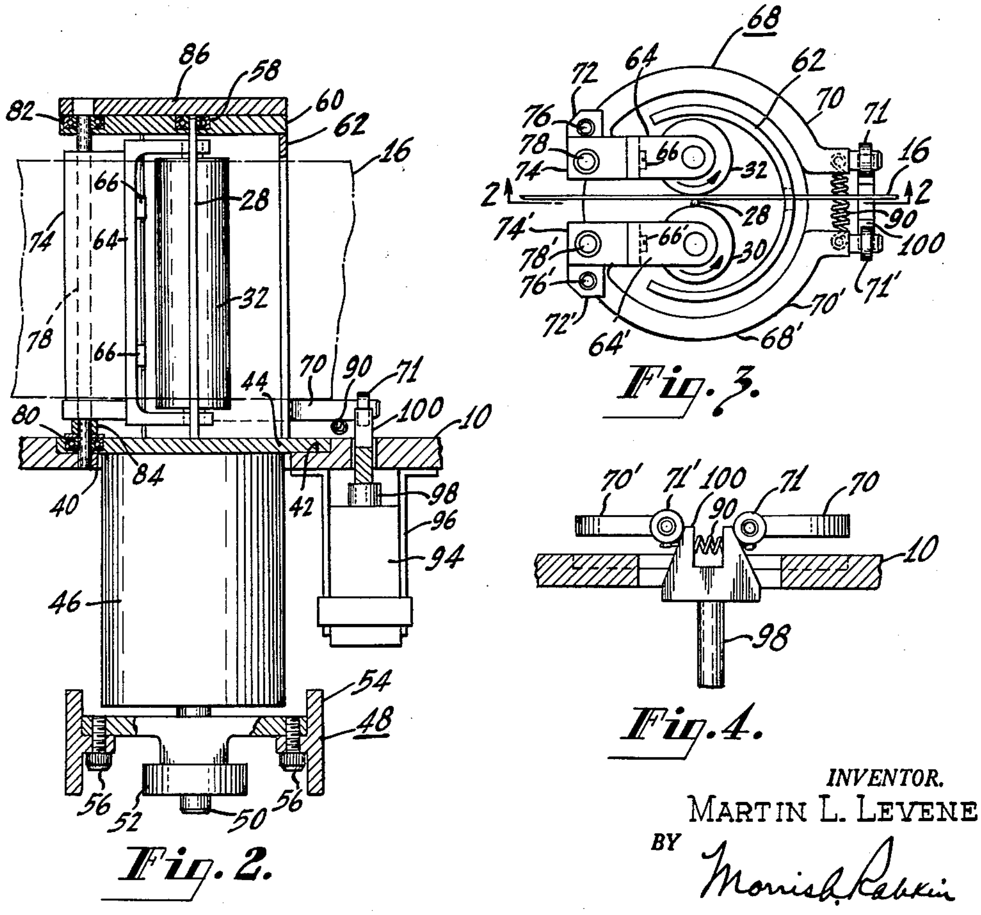
FIGURE 2 is a fragmentary, sectional view, taken along the lines 2—2 of FIG. 3 and showing in detail one form of tape drive mechanism such as can be used in the transport of FIG. 1.
FIGURE 3 is a fragmentary, plan view of the tape drive mechanism shown in FIG. 2 with the top covers of the mechanism removed.
FIGURE 4 is a fragmentary, side view showing a portion of the actuating means for the tape drive mechanism shown in FIGS. 2 and 3.

Referring, now, to FIGS. 2 to 4 of the drawings, the parts of one form of tape drive mechanism, such as illustrated diagrammatically in FIG. 1, are shown, hte drive mechanism 24 being taken by way of example. The tape drive mechanism is supported on the deck plate 10 of the tape transport. The deck plate 10 is formed with an opening 40 which is counterbored to provide a circular seat 42. A circular mounting plate 44 is secured on the seat by means of counter sunk screws (not shown). An electric motor 46 is secured to the mounting plate 44 and extends below the deck plate 10. The motor 46 may be a hysteresis synchronous motor which has a constant speed characteristic. The leads for supplying power to the motor are not shown. A flywheel 48 is secured to the lower part of the shaft 50 of the motor 46 and includes a flanged collar 52 and a flanged ring 54. The ring 54 is secured to the collar by means of screws 56. The flywheel 48 provides inertial speed regulation for the motor 46. The upper end of the motor shaft 50 defines the needle-like capstan 28 which is of considerably smaller diameter than capstans heretofore used in tape drive systems. For example, the capstan 28 may have a shaft diameter in the range of only 70 to 80 mils (thousandths of an inch). The capstan can be of whatever length is necessary to accommodate the width of the tape which is to be driven. For example, when driving a tape two inches wide, the capstan 28 may have a free length of over two inches.

The capstan is supported at its upper end in a ball bearing 58 mounted in a generally circular plate 60 which forms the top cover of a case 62. The case 62 is cut away to provide clearance for the passage of the tape 16 and also clearance to accommodate the pressure rollers 32, 30 and their associated mounting means. The pressure rollers 30 and 32 are suitably made of resilient material, such as rubber. The pressure roller 32 is journaled in a U-shaped bracket 64 which is attached by screws 66 to a crank type lever 68. This lever 68 includes a curved lever arm 70 having a reduced diameter at its free end on which a roller 71 is rotatably mounted and an L-shaped lever arm 72 having a vertically extending block 74 to which the bracket 64 is attached. The L-shaped arm 72 is fastened to the curved lever arm 70 by means of a rivet, screw or other suitable fastening means 76. A pin 78 extends through the block 74. The pin is journaled in the deck plate 10 and in the cover 60 of the case 62 on ball bearings 80 and 82. A bushing 84 on the deck 10 around the pin 78 spaces the lever 68 and the block 74 thereof from the deck 10. The upper end of the pin 78 is slightly flanged so as to limit axial movement of the pin 78. The flanged end of the pin 78 is held in another cover plate 86 which is disposed on top of the cover plate 60 of the case 62. The cover plates 86 and 60 may be held together by means of screws (not shown).

The other pressure roller 30 is mounted on a lever arrangement similar to the lever arrangement 68 but a mirror image thereof. Accordingly, the parts of the lever which carries the pressure roller 30 are identified with like reference numerals having primes appended therheto.

A tension spring 90 connects the ends of the lever arms 70 and 70' near the wheels 71 and 71'. This spring 90 biases the lever 68' for movement in a counterclockwise direction around its pivot pin 78' and biases the lever 68 for movement in a clockwise direction around its pivot pin 78. Thus, the pressure rollers 30 and 32 are biased into engagement with capstan 28. The tape 16 is pinched between the capstan 28 and the pressure roller 32. Accordingly, the tape 16 is driven by the capstan. The opposing pressure rollers 30 and 32 are on diametrically opposite sides of the capstan 28. Therefore, these pressure rollers 30 and 32 prevent deflection of the capstan, since the forces exerted by the pressure rollers 30 and 32 on the capstan 28 compensate each other. There is sufficient clearance in the mountings of the pivot pins 78 and 78' and in the journals for the pressure rollers 30 and 32 in the respective brackets 64 and 64' so that the pressure rollers 30 and 32 effectively have floating mountings. This permits the pressure rollers 30 and 32 to align themselves with each other and with the capstan 28.

The pressure rollers 30 and 32 are operated in a manner to engage and disengage the capstan 28 simultaneously. The actuating mechanism therefor includes a solenoid 94 which is attached to the under side of the deck plate by means of a bracket 96. The armature 98 of the solenoid 94 extends through an opening in the deck plate 10. A cam 100 in the form of a tapered wedge is mounted on the end of the armature 98. This cam 100 moves between the ends of the lever arms 70 and 72 and engages the wheels 71 and 71'. When signals of one polarity are applied to the solenoid (leads for application of such signals not shown in the drawings), the cam 100 is retracted to the position shown in FIG. 4. The levers 68 and 68' then move under the bias of the spring 90 to bring the pressure rollers 30 and 32 simultaneously into engagement with the capstan 28. When signals of the opposite polarity are applied to the solenoid, the armature 98 moves upwardly and the cam 100 spreads the arms 70 and 70' away from each other, thus moving the pressure rollers 30 and 32 simultaneously out of engagement with the capstan. Appropriate command signals are applied to the solenoid depending upon whether the tape is to be driven or not.

A tape drive mechanism such as described herein is low in cost, since it requires few parts and eliminates expensive speed reduction units. The space requirements for the drive mechanism are also reduced, since the capstan and the motor are integral with each other. Power consumption is also reduced, since the power loss in a speed reduction unit is eliminated.

From the foregoing description, it will be apparent that there has been provided a new and improved tape driving mechanism, features of which are especially advantageous where accuracy and efficiency of tape drive are desired. Various modifications in the mechanism and in the elements thereof will, no doubt, be apparent to those skilled in the art. For example, different arrangements of pressure rollers may be provided to prevent deflection of the needle-like capstan. Thus, one of the pair of opposed pressure rollers may be rotatable in a fixed position, while the other is pivotally movable toward or away from the capstan. Other changes within the spirit of the invention are also possible. Accordingly, the foregoing description should be taken as illustrative and not in any limiting sense.

What is claimed is:

1. Apparatus for driving a tape at a certain speed which comprises a slender, deflectable tape drive member rotatable at a peripheral speed equal to said certain speed, a drive motor having said tape drive member as the shaft thereof, and a pair of rotatable members engageable with said drive member to prevent deflection thereof, at least one of said pair of members being also engageable with said tape for urging said tape into driving relationship with said tape drive member.

2. Apparatus for driving a tape at a certain speed comprising a needle-like capstan rotatable on its axis at a peripheral speed equal to said certain speed, and a pair of pressure rollers movable toward and away from said capstan on opposite sides of said capstan to prevent deflection of said capstan from its axis of rotation, one of said pair of pressure rollers being engageable with said capstan through said tape for pinching said tape against said capstan into driving relationship therewith and the other of said pair of pressure rollers being directly engageable with said capstan.

3. Apparatus for driving a tape at a certain speed which comprises a support plate over which said tape can pass, a needle-like, rotatable capstan, means on said support plate for mounting said capstan for rotation with its axis substantially perpendicular to said plate, a pair of rotatable pressure rollers movably mounted on said plate in opposed relation to each other on opposite sides of said capstan, at least one of said pair of pressure rollers being on the opposite side of said tape from said capstan, means for moving said pressure rollers simultaneously into engagement with said capstan, said one pressure roller engaging said tape for pinching said tape into driving relation with said capstan, and drive means directly coupled to said capstan for driving said capstan at a peripheral speed equal to said certain speed.

4. A tape drive mechanism which comprises a flexible, rotatable capstan having needle-like form, a pair of pressure rollers disposed on opposite sides of said capstan and having their axes parallel to the axis of said capstan, movable, floating mountings for each of said pressure rollers, and means for moving said mountings for simultaneously moving both of said pressure rollers into engagement with said capstan so as to prevent deflection of said capstan during tape drive.

5. A tape drive mechanism which comprises a flexible, needle-like capstan rotatable on its axis, a pair of rotatable pressure rollers disposed on opposite sides of said capstan with their axes parallel to said capstan axis, a pair of pivotally mounted means each separately carrying a different one of said pair of rollers, and an actuating member simultaneously engageable with said pair of pivotally mounted means for simultaneously pivoting said pair of pivotally mounted means each in an opposite direction so as to engage said pair of pressure rollers simultaneously with said capstan when said actuating member moves in one of said opposite directions and to disengage said rollers simultaneously from said capstan when said actuating member moves in the other of said opposite directions.

6. A tape drive mechanism which comprises a needle-like capstan rotatable on its axis, a pair of rotatable pressure rollers engageable with said capstan and having diameters many times greater than the diameter of said capstan, said rollers being disposed on opposite sides of said capstan with their axes parallel to said capstan axis, a pair of levers each having two arms, one of said pair of rollers being mounted on one of said arms of one of said pair of levers, the other of said pair of pressure rollers being mounted on one of said arms of the other of said pair of levers, the end of the other of said arms of said one lever and the end of the other of said arms of said other lever being disposed opposite to each other, and an actuating member movable in opposite directions between the ends of said other lever arms for simultaneously engaging said other lever arms and simultaneously pivoting said levers to engage said rollers simultaneously with said capstan when said actuating member moves in one of said opposite directions and to disengage said rollers simultaneously from said capstan when said actuating member moves in the other of said opposite directions.

7. A tape drive mechanism which comprises a needle-like capstan rotatable on its axis, a pair of rotatable pressure rollers engageable with said capstan and having diameters many times greater than the diameter of said capstan, said rollers being disposed on opposite sides of said capstan with their axes parallel to said capstan axis, a pair of levers each having two arms, one of said pair of rollers being mounted on one of said arms of one of said pair of levers, the other of said pair of pressure rollers being mounted on one of said arms of the other of said pair of levers, said levers being pivotally mounted for moving said pressure rollers into engagement with said capstan at diametrically opposite positions on said capstan, the end of the other of said arms of said one lever and the end of the other of said arms of said other lever being disposed opposite to each other, a spring connected between said other lever arm ends for biasing said pressure rollers into simultaneous engagement with said capstan, and an actuating member moveable in opposite directions between the ends of said other lever arms for simultaneously engaging said other lever arms and simultaneously pivoting said levers to engage said rollers simultaneously with said capstan when said actuating member moves in one of said opposite directions and to disengage said rollers simultaneously from said capstan when said actuating member moves in the other of said opposite directions.

8. Apparatus for driving a tape at a certain speed which comprise an electric motor having a rotatable shaft, an extension of said shaft being of very much smaller diameter than the remainder thereof and defining a needle-like capstan, said motor being rotatable at a speed such that the peripheral speed of said capstan equals said certain speed, and a pair of pressure rollers movable into engagement with said capstan on opposite sides thereof to prevent deflection thereof, at least one of said pair of rollers being also engageable with said tape for pressing said tape against said capstan into driving relationship therewith.

9. Apparatus for driving a tape at a certain speed which comprise an electric motor having a rotatable shaft including as part thereof a needle-like capstan, said motor being rotatable at a speed such that the peripheral speed of said capstan equals said certain speed, and a pair of pressure rollers movable into engagement with said capstan on opposite sides thereof to prevent deflection thereof, at least one of said pair of rollers being also engageable with said tape for pressing said tape against said capstan into driving relationship therewith.

References Cited in the file of this patent

UNITED STATES PATENTS

| | | |
|---|---|---|
| 2,510,923 | Brastad et al. | June 6, 1950 |
| 2,590,665 | Williams | Mar. 25, 1952 |
| 2,757,242 | Ranger | July 31, 1956 |
| 2,920,148 | Munroe | Jan. 5, 1960 |
| 3,001,733 | Axon et al. | Sept. 26. 1961 |

FOREIGN PATENTS

| | | |
|---|---|---|
| 352,505 | Switzerland | Apr. 14, 1961 |
| 647,606 | Great Britain | Dec. 20, 1950 |